United States Patent [19]
Roovers et al.

[11] Patent Number: 5,288,834
[45] Date of Patent: Feb. 22, 1994

[54] FUNCTIONALIZED POLYARYLETHERKETONES

[75] Inventors: Jacques Roovers, Gloucester; Fei Wang; Michael Guiver, both of Ottawa, all of Canada

[73] Assignee: National Research Council of Canada, Ottawa, Canada

[21] Appl. No.: 36,868

[22] Filed: Mar. 25, 1993

[51] Int. Cl.$^5$ .................. C08G 8/02; C08G 14/00; C08G 65/48
[52] U.S. Cl. .................. 528/125; 528/126; 528/128; 528/174; 528/220; 525/534
[58] Field of Search ............... 528/125, 126, 128, 174; 525/534

[56] References Cited

U.S. PATENT DOCUMENTS

| | | | |
|---|---|---|---|
| 4,419,486 | 12/1983 | Rose | 528/125 |
| 4,996,271 | 2/1991 | Guiver et al. | 528/171 |
| 5,004,836 | 4/1991 | Kricheldorf et al. | 528/125 |

FOREIGN PATENT DOCUMENTS 3838644 11/1988 Fed. Rep. of Germany.
2-188552 7/1990 Japan.

OTHER PUBLICATIONS

Polymer, 1991, vol. 32, No. 9, "Amine-terminated (PAEK)-epoxy/amine resin systems as tough high performance materials" Bennett et al., pp. 1633–1641.
32nd International SAMPE Symposium, Apr. 6–9, 1987.
"Ketimine Modifications as a Route to Novel Amorphous and Derived Semicrystalline (PAEK) Homo and Copolymers", D. K. Mohanty et al., pp. 408–419.
New Polymeric Mater., vol. 1, No. 2, pp. 127–141 (1988) "New Polymer Syntheses 14 New Crystalline and Amorphous Aromatic poly(ether ketone)s", Kricheldorf et al.
Macromolecules, vol. 23, No. 18, Sep. 3, 1990, "Synthesis of Soluble High Molecular Weight PAEK's Continuing Bulky Substituents", Risse et al., pg.
Macromolecules 1991, 24, 3045–3049, "Surface Modification of Poly(ether ether ketone)", Franchina et al.

Primary Examiner—John Kight, III
Assistant Examiner—P. Hampton-Hightower
Attorney, Agent, or Firm—Juliusz Szereszewski

[57] ABSTRACT

Bromomethyl derivatives of polyaryl ether ketones are obtained by brominating methyl derivatives of the ketones preferably with elemental bromine, optionally under UV light. The bromomethyl derivatives are useful as intermediates for further functionalization of the aromatic polyether ketones. The functionalized derivatives, depending on the substituent, exhibit different properties than the basic polymer, for example increased hydrophilicity and solubility.

15 Claims, 3 Drawing Sheets

Fig. 3 a. $H_2O$;  b. (1) $NaClO_2$, (2) HCl;  c. $(CH_3)_3OBF_4$, $[(CH_3)_2CH]_2NC_2H_5$,  d. $SF_4$

FUNCTIONALIZED POLYARYLETHERKETONES

FIELD OF THE INVENTION

This invention relates to certain derivatives of polyaryletherketones and processes for their preparation. More specifically, the invention provides certain novel derivatives of the ketones, novel intermediates, and synthetic routes for preparation of the intermediates and derivatives of the polymers.

BACKGROUND OF THE INVENTION

Aromatic polyetherketones, for example poly(aryl ether ether ketone) (PEEK) or poly(aryl ether ether ketone ketone) (PEEKK) are generally crystalline high-performance engineering thermoplastics exhibiting relatively high chemical and thermal stability. Among these, PEEK is the most widely used material. Its applications include polymeric supports, insulations, membranes, structural articles and matrix materials for thermoplastic composites.

PEEK type polymers are hydrophobic in nature which limits their membrane application e.g. in separation of aqueous solutions. Also, the poor solubility of PEEK type polymers in conventional ordinary solvents makes the manufacture of membranes difficult.

There is a need to modify these polymers to obtain their substituted derivatives having different properties and structure than the basic polymers.

Generally, there are two ways to functionalize polymers. One is the use of a functionalized comonomer during polymerization, such as the addition of chloromethylated styrene in the polymerization of polystyrene. Commercially and in most laboratories, PEEK is prepared by the nucleophilic substitution reaction of hydroquinone with difluorobenzophenone. Thus, functional groups which can undergo a nucleophilic reaction cannot be introduced into the monomer before the polymerization. This severely limits the scope of the functionalized monomer approach.

The second route involves a modification reaction on the preformed polymer. In the second approach, one of the known methods of polymer modification is bulk sulfonation in sulfuric acid, described for example in U.S. Pat. No. 4,419,486 to Rose. However, due to the poor solubility of PEEK (and other polyaryl ether ketones) in normal organic solvents, other types of functionalization are difficult to perform.

While the sulfonated PEEK derivatives have better hydrophilicity and solubility than the basic PEEK, it is difficult in bulk sulfonation to control the degree of substitution (DS) and the uniformity of substitution. Bulk-sulfonated PEEK becomes too hydrophilic when the degree of substitution is over 80%, resulting in severe swelling or dissolution.

To our knowledge, no method of bulk functionalization of PEEK other than sulfonation and chlorosulfonation is known to date. Some surface functionalization reactions have been described in the scientific literature; for example, N. L. Franchina and T. J. McCarthy, Macromolecules 1991, 24, 3045, reported surface modification of PEEK wherein a series of carbonyl selective reactions were carried out on the surface of a PEEK film. These substitutions lead to polymers which no longer contain the ether-ketone sequences.

An alternative to the above classic modification routes is to introduce an inert pendent group into the monomer and to modify this group after its incorporation in the polymer. PEEK polymers with methyl, phenyl and t-butyl substituents have been prepared, as reported by Kricheldorf et al, New Polymeric Mater. 1988, 1,127; Mohanty et al., J. E. SAMPE Symp. 1986, 31, 945; Risse et al. Macromolecules 1990, 23, 4029; and Bennett et al., polymer 1991, 32, 1633. Low molecular weight amine-terminated methyl and t-butyl substituted PEEK's were prepared and used in epoxy/amine resins. These polymers have not been used as the basis for further modification or the preparation of functionalized polyaryl ether ketones.

Methyl derivatives of polyaryletherketones are described in German OS No. DE 3838644 A1 filed Nov. 15, 1988 and in Japanese patent application (kokai) No. 90-188552 filed Jul. 24 1990.

SUMMARY OF THE INVENTION

It is an object of the present invention to provide a controllable process for preparing certain homogeneously functionalized derivatives of aromatic polyetherketones.

It is another object of the invention to provide a process for preparing high performance polymers with functional groups on the polymer chain for specialty applications such as membrane materials.

According to the invention, there is provided a process for preparing derivatives of certain polyaryletherketones containing repeat units alone or in conjunction with other repeating units selected from the group consisting of subunits and where the subunit M is selected from the group consisting of and

VI

A is —O— or —CO— and n is 1 or 2,
the process comprising
  a) providing a methyl derivative of said polyaryletherketone with methyl groups being substituted predominantly on the phenylene rings of the subunit M,
  b) brominating said methyl derivative of a) with bromine or a brominating compound to obtain a bromomethyl and/or dibromomethyl derivative of the polyaryl ether ketone.

The step b) may be controlled to obtain mono- or di-bromomethyl derivatives of the polymers, or a mixture thereof.

While bromine is preferable for the bromination of step b), NBS may also be used under controlled conditions.

For clarification, the subunit III may contain, e.g.
—O—Ph—CO—Ph—
—CO—Ph—CO—Ph—
—CO—Ph—CO—Ph—CO—Ph—
—CO—Ph —O—Ph—CO—Ph— or
—O—Ph—CO—Ph—CO—Ph—.

The invention also provides new compounds, the bromomethyl derivatives of polyaryletherketones, obtained by the above-defined process. These bromomethyl derivatives are intermediates for other, "final" derivatives as defined below.

Further, the process of the invention includes a step for preparing other derivatives of the polyaryletherketones, said step comprising
  c) reacting the bromomethyl derivative of step b) with a reagent capable of substituting the bromine of the mono- or dibromomethyl group of the polymer with another desired functional group, the reagent selected for example from the group consisting of: methanol, benzyl(triethyl)ammonium permanganate, tetrabutylammoniumpermanganate, water, sulfuric acid, tetraethylammonium cyanide, potassium acetate, diethylamine, triethylamine, sodium chlorite, trimethyloxonium tetrafluoroborate, N,N-diisopropylethylamine, and sulfur tetrafluoride.

Examples of the polyaryletherketones which have a structure suitable for the preparation of the bromomethyl derivatives according to the invention are:
  poly(aryl ether ether ketone), or poly[oxy(methyl-1,4-phenylene)oxy-1,4-phenylenecarbonyl-1,4-phenylene] (PEEK)
  poly(aryl ether ether ketone ketone) (PEEKK),
  poly(aryl ether ether ketone ether ketone ketone) (PEEKEKK),
  poly(aryl ether ketone ether ketone) (PEEKEK)
and other polymers containing repeat phenylenoxy and phenylenecarbonyl groups. Instead of the paraphenylene, metaphenylene (1,3 - dioxyphenylene) links may be present in the polymer.

In the synthesis of the methyl derivatives of the polyaryl ether ketones of the formula (I), methyl substitution occurs almost exclusively at the phenylene rings of the subunit M. Up to four substitutions per phenylene ring are theoretically possible, but not all the subunits M have to contain a methyl group. In practice, mono-, di- and trimethylphenylene are prevalent. Accordingly, upon subsequent bromination, the monobromomethyl and/or dibromomethyl substituents are formed in the ortho or meta position to the ether linkages on the phenylene ring(s). Thus, there are several structural possibilities of the bromomethyl substitution and all of them are equivalent for the purpose of this invention.

Accordingly, the bromomethyl derivatives of the present invention may be defined as containing a repeat unit (VII)

$-O-MMe_xBr_y-O-$ alone or in conjunction with other repeat units selected from subunit II

II $-CO-$ or

III $+A-$ $)_n$ $-CO-$ where M is a subunit selected from

IV

V and

VI

Me is methyl or substituted methyl, x is a number from 0.01 to 12, preferably from 0.5 to 6; y corresponds to the number of methyl groups x multiplied by the degree of bromination, explained hereinbelow; A is —O— or —CO— and n is 1 or 2. Regarding the determination of the numeral x, it can be assumed that the methyl derivatives of polyaryletherketones are suitable for the bromination according to the present invention even if only about 1% of the subunits M have a methyl radical.

The bromomethyl derivatives of polyaryletherketones (referred to hereinbelow as PAEK) are suitable as substrates for further synthesis of the following exemplary derivatives:
Monobromomethyl derivative:
  methoxymethylene polyaryletherketone, methyl carboxylate PAEK, hydroxyl methylene PAEK, cyanomethylene PAEK, acetic acid PAEK, acetoxymethylene PAEK, diethylamine hydrogenbromide methylene PAEK, diethylamine methylene PAEK, and triethylammonium bromide methylene PAEK.

Dibromomethyl derivative:

aldehyde PAEK, carboxylic acid PAEK, methyl carboxylated PAEK.

The above examples, as mentioned already, are not exhaustive.

It will be understood that the bromomethyl derivative of the invention may quite often be a mixture of the monobromo- and dibromomethyl derivatives. For the purposes of the invention, the compound will be referred to as the monobromomethyl derivative when the bromination level of the methyl groups is from about 1% to about 70%, and as dibromomethyl derivative, when the bromination level of the methyl groups is from about 50% to about 100%.

While the following detailed description and examples concentrate on PEEK only, it will be apparent for those skilled in the art that a range of polymers, as defined herein, are suitable for the purpose of this invention. The extension of the basic idea of the invention to these other polymers, with paraphenylene rings being replaced e.g. with metaphenylene, and methyl substitution occurring at any position on the phenylene ring of the subunit M is obvious in light of the present knowledge in the field of polymer science.

DETAILED DESCRIPTION OF PREFERRED EMBODIMENTS OF THE INVENTION

Figure 1:
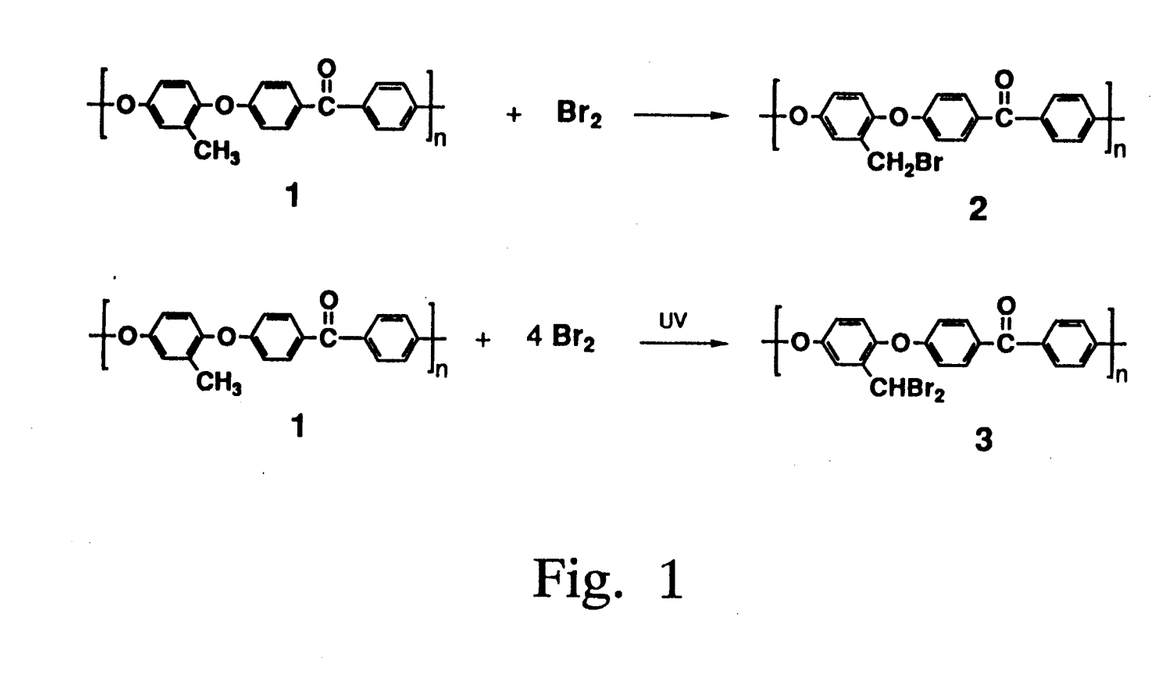
FIG. 1 illustrates exemplary bromination reactions of the invention.
Figure 2:
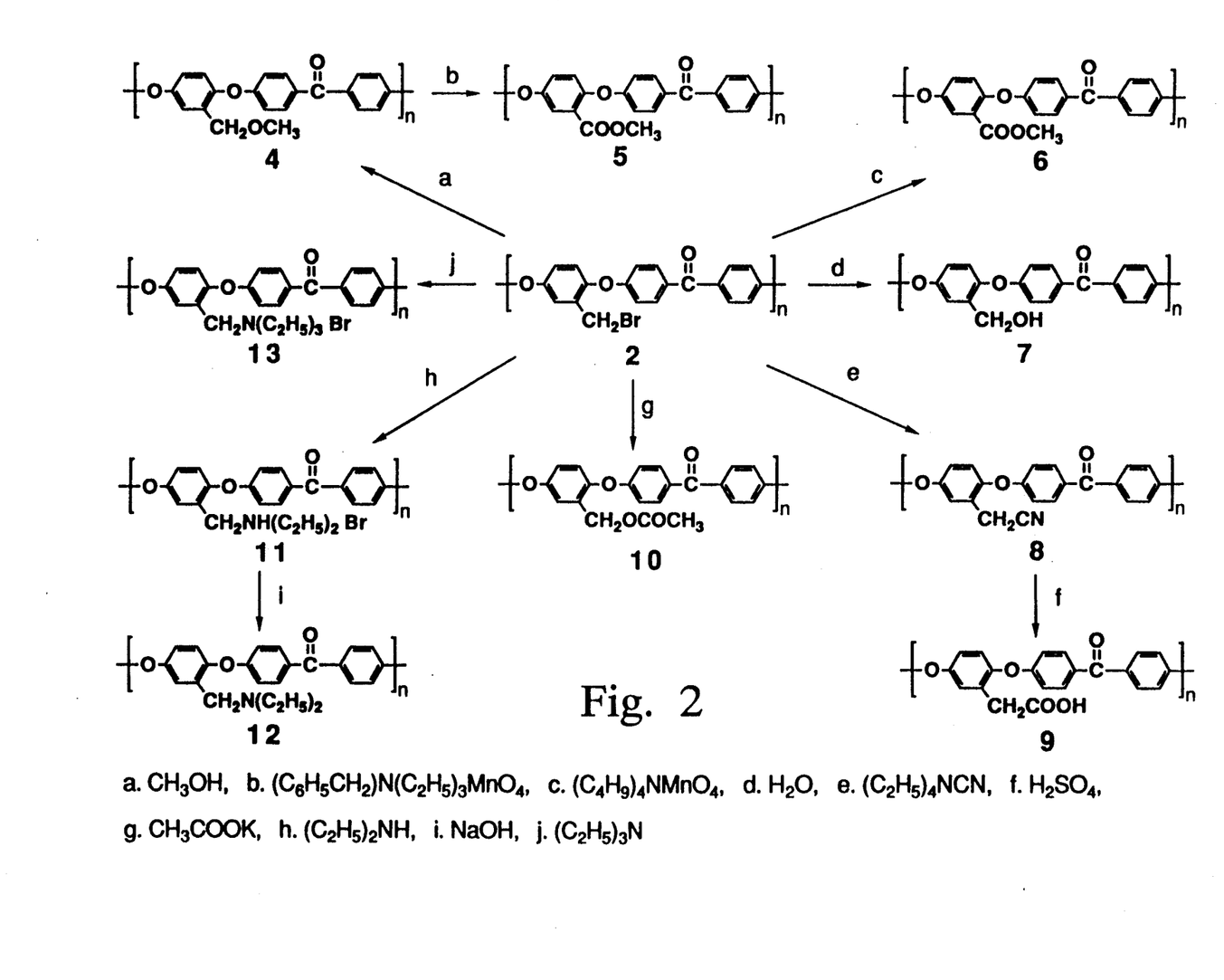
FIG. 2 illustrates further exemplary functionalization reactions carried out with the monobromomethyl derivative of PEEK.
Figure 3:
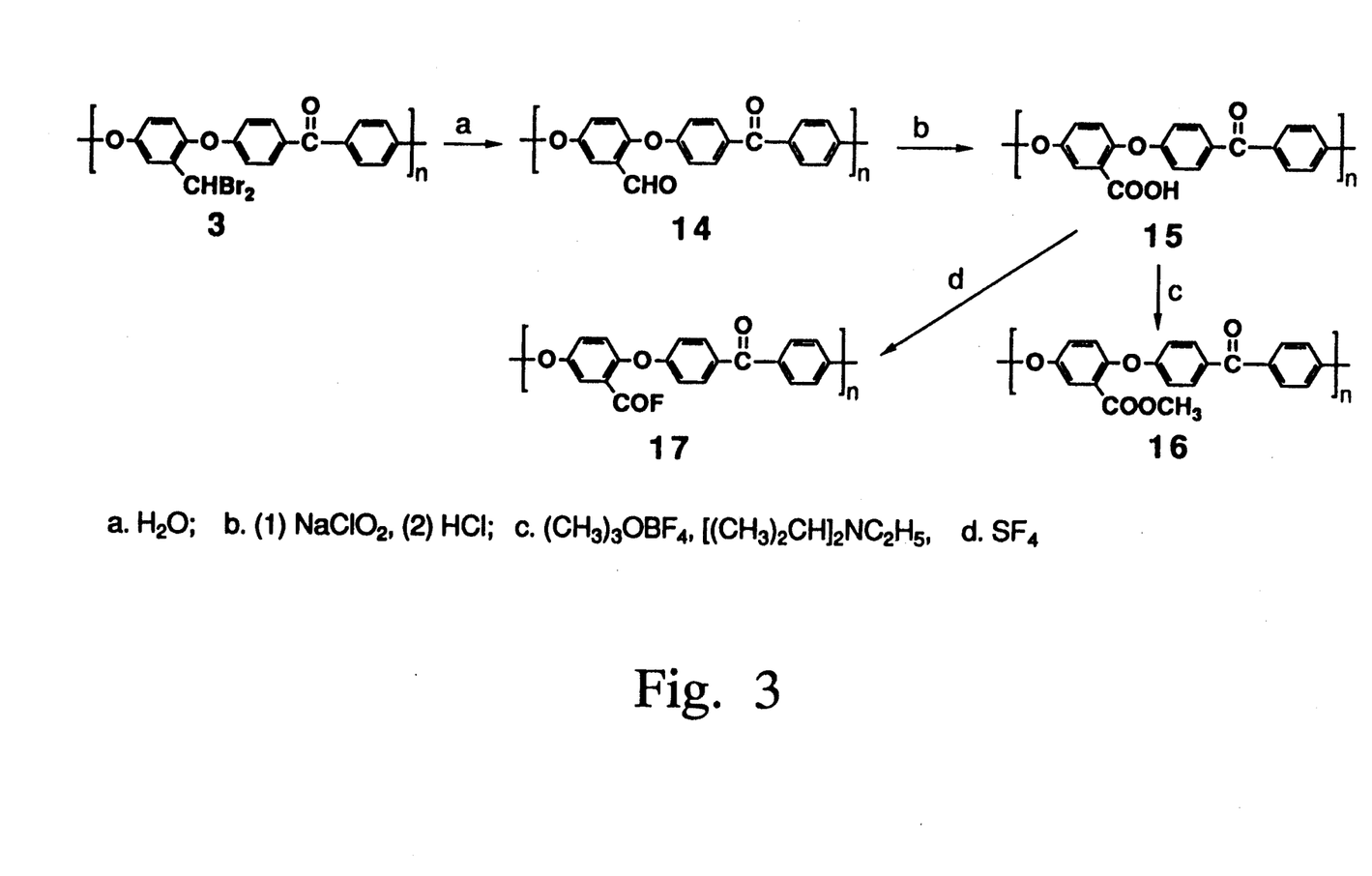
FIG. 3 illustrates further exemplary functionalization reactions carried out with the dibromomethyl derivative of PEEK.

The process of the invention combines the two basic approaches for the functionalization of polymers as discussed in the Background section of the disclosure. It takes advantage of the fact that the methyl derivatives of the polyaryletherketones under consideration do not undergo nucleophilic substitution under the normal conditions of the polymerization because of low reactivity of the methyl group. On the other hand, the bromomethyl (this term, as mentioned herein, including monobromo-, dibromoderivatives and a mixture thereof) derivatives are quite suitable as starting compounds for synthesis of further derivatives of the polymers under consideration, polyaryletherketones.

In the following examples, N-methyl-2-pyrrolidinone (Aldrich; NMP) was dried overnight over $CaH_2$ and distilled under $N_2$ at reduced pressure over $P_2O_5$. All other organic solvents were purified according to standard procedures. Benzyl(triethyl)ammonium permanganate and tetrabutylammonium permanganate were prepared according to literature procedures.

$^1$H-NMR and $^{13}$C-NMR spectra were recorded on a Bruker AM-400 spectrometer. Infrared spectra were recorded on a Perkin Elmer 1500 FTIR spectrometer. Size exclusion chromatography (SEC) was performed on a Waters SEC system with differential refractometer and variable wavelength US/Vis spectrometer detectors. All the reaction temperatures reported are bath temperatures.

It will be seen from the following disclosure that different levels of bromination are achieved by the use of different amounts of bromine in the same procedure. For the preparation of the so-called monobromomethyl derivatives (products containing predominantly monobromomethyl groups), the use of UV light is not necessary. Above 4 mol equiv. $Br_2$ with the use of UV light, the level of bromination to the dibromomethyl derivative was nearly 100%.

EXAMPLES

The following examples are submitted to validate the invention by illustrating some embodiments thereof and are not intended to limit the scope of the present invention. Unless indicated otherwise, the percentages are by weight. Yields are expressed in mol percentages.

EXAMPLE 1

Preparation of methyl poly(aryl ether ether ketone)

Methyl hydroquinone (12.414 g, 0.1 mol), 4,4'-difluorobenzophenone (21.82 g, 0.1 mol), $K_2CO_3$ (14.512 g, 0.105 mol), 175 mL of NMP, and 85 mL of toluene were charged into a four-necked 500 mL flask equipped with $N_2$ inlet, mechanical stirrer, thermometer and Dean-Stark trap. The mixture was heated in a silicone oil bath. The temperature was raised to 143° C. in 0.5 h, when the toluene azeotrope began to reflux, and then to 175° C. over a 2.5 h period to remove all water. The polymerization was continued for another 4-5 h while the temperature was slowly raised to 187° C. The reaction mixture was cooled to room temperature, diluted with 400 mL THF, and filtered to remove inorganic salts. Ten mL of acetic acid was added to the filtrate and the polymer was precipitated in methanol. The white polymer 1 was washed two times with boiling methanol and dried in a vacuum oven at 70° C. for two days, yield: 95%. IR spectroscopy (film): 1654, 1599, 1487, 1416, 1381, 1307, 1276, 1227, 1190, 1161, 928 $cm^{-1}$; $^1$H NMR (400 MHz, $CDCl_3$) 2.19 (s, 3H), 6.92–7.06 (m, 7H), 7.77–7.82 (m, 4H).

EXAMPLE 2

Preparation of monobromomethyl poly(aryl ether ether ketone)

Different levels of bromination are achieved by using different amounts of bromine in the same procedure. The general procedure is described hereinbelow. Some reactions were carried out with UV light (see Table 1).

Polymer 1 (3.0 g, 9.9 mmol), 140 mL of 1,2-dichlorobenzene and 30 mL chlorobenzene were charged into 250 mL three-necked flask equipped with $N_2$ inlet, addition funnel, and Dean-Stark trap. The mixture was heated in a silicone oil bath with stirring until all polymer dissolved, then the temperature was raised to 190° C. to distil off 30 mL of chlorobenzene to dry the reaction mixture. While the temperature was kept at 170° C., bromine (1.9 g, 11.8 mmol, dried by shaking twice with conc. sulfuric acid) was slowly added during 4 h period. The reaction mixture was cooled to room temperature and then precipitated into methanol. The polymer was collected by filtration and air dried. The polymer was then redissolved in 100 mL chloroform, filtered, and precipitated into methanol. The polymer was washed twice with boiling methanol and dried in vacuum oven at 60° C. 3.62 g (98%) white polymer 2 was obtained.

Overall bromination results are summarized in Table 1.

The general yields of the polymers were in the range of 95% to 98%

TABLE I

NMR and Elemental Analysis Results of Polymers

| Sample | Reaction condition | Bromination level[a] | | | Elemental Analysis | | |
|---|---|---|---|---|---|---|---|
| | | $-CHBr_2$ | $-CH_2Br$ | $-CH_3$ | % C found (calcd) | % H found (calcd) | % Br found (calcd) |
| 2a | 0.8 mol equiv $Br_2$ with UV light | 0.06 | 0.43 | 0.51 | 69.79 (69.40) | 3.82 (3.92) | 13.03 (12.81) |
| 2b | 1.2 mol equiv. $Br_2$ with UV light | 0.28 | 0.61 | 0.11 | 61.55 (60.79) | 3.31 (3.27) | 23.66 (23.80) |
| 2c | 1.2 mol equiv $Br_2$ no UV light | 0.13 | 0.62 | 0.25 | 65.48 (64.71) | 3.36 (3.56) | 18.01 (18.79) |
| 2d | 1.0 mol equiv $Br_2$ no UV light | 0.12 | 0.60 | 0.28 | 65.74 (65.17) | 3.54 (3.60) | 17.82 (18.21) |
| 2e | 0.8 mol equiv $Br_2$ no UV light | 0.06 | 0.50 | 0.44 | 68.96 (68.39) | 3.76 (3.84) | 13.60 (14.10) |

[a]From $^1$H-NMR

EXAMPLE 3

Preparation of dibromomethyl poly(aryl ether ether ketone).

Polymer 1 (10.0 g, 0.033 mol), 400 mL of 1,2-dichlorobenzene and 50 mL chlorobenzene were charged into 1000 mL three-necked flask equipped with $N_2$ inlet, addition funnel, and Dean-Stark trap. The mixture was heated in silicone oil bath with stirring until all polymer dissolved, then the temperature was raised to 200° C. to distill off 50 mL chlorobenzene to dry the reaction mixture. A long wavelength UV lamp was used within 10 cm from the flask. While the temperature was kept at 170° C., bromine (21.2 g, 0.132 mol, dried by shaking two times with conc. sulfuric acid) was added dropwise during 1 h period. When the addition was completed, the UV-illuminated reaction mixture was kept in 170° C. stirred for 1 h. The reaction mixture was cooled to room temperature and then precipitated into 2 L methanol. The polymer was collected on filter and air dried. Then the polymer was redissolved in 350 mL chloroform, filtered and precipitated into 1.7 L methanol. The polymer was washed twice with boiling methanol and dried in a vacuum oven at 60° C.; 14.9 g (95% yield) of white polymer 3 was obtained. Anal. calcd. for $C_{20}H_{12}Br_2O_3$: C, 52.21; H, 2.63; Br, 34.73. Found: C, 53.59; H, 2.47; Br, 34.33.

EXAMPLE 4

Preparation of methoxymethylene poly(aryl ether ether ketone)

Polymer 2 (1.50 g, 4.0 mmol) was dissolved in 150 mL NMP and heated to 90° C. 12 mL dry methanol was added to the polymer solution. The temperature was raised to 120° C. and the mixture stirred for 6 h. The cooled polymer solution was precipitated into a mixture of methanol and hexane (2:1), filtered and dried in air. The polymer was redissolved in 100 mL chloroform, filtered and precipitated into methanol. Polymer was then washed twice with boiling methanol and dried in a vacuum oven at 60° C.; 1.10 g (83%) white product 4 was obtained. Anal. Calcd. for $C_{20.84}H_{15.68}O_{3.84}$ (60% $-CH_2OCH_3$, 12% $-CH(OCH_3)_2$, 28% $-CH_3$): C, 76.42; H, 4.82. Found: C, 74.37; H, 4.43.

EXAMPLE 5

Preparation of methyl carboxylate poly(aryl ether ether ketone)

Polymer 4 (0.30 g, 0.93 mmol) was dissolved in 150 ml dry dichloromethane with stirring. Benzyl(triethyl)ammonium permanganate (0.58 g, 1.86 mmol) was added and the solution was left standing at room temperature for 54 h. The reaction mixture was filtered through a fritted glass filter. The filtrate was concentrated to about 30 mL and precipitated into methanol. The polymer was treated with hot acidic aqueous solution of sodium bisulphite to remove $MnO_2$, then washed with water and boiling methanol, and dried in a vacuum oven at 60° C. to give 0.27 g of white polymer 5. IR spectroscopy showed a carbonyl band at 1734 cm$^{-1}$. Anal. Calcd. for $C_{20.84}H_{15.24}O_{4.06}$ (38% $-CH_2OCH_3$, 22% $-COOCH_3$, 12% $-CH(OCH_3)_2$, 28% $-CH_3$): C, 75.71; H, 4.65. Found: C, 74.89; H, 4.25.

EXAMPLE 6

Preparation of methyl carboxylate poly(aryl ether ether ketone)

Polymer 2 (0.50 g, 1.31 mmol) was dissolved in 100 mL dichlorobenzene by heating to 110° C. The temperature was kept at 90° C. and a solution of tetrabutylammonium permanganate (1.18 g, 3.28 mmol) in 50 mL dichlorobenzene was added during 1 h. The mixture was stirred for another 20 min. and cooled to room temperature, and then precipitated into a dilute HCl methanol solution. The light brown coloured polymer was treated with hot acidic aqueous solution of sodium bisulphite to remove $MnO_2$, then washed with water and methanol, and dried in vacuum oven at 60° C. to give 0.38 g of polymer 6. IR spectroscopy showed a carbonyl band at 1735 cm$^{-1}$. Anal. Calcd for $C_{20.49}H_{14}O_{3.98}$ (49% $-COOCH_3$, 51% $-CH_3$): C, 75.98; H, 4.36. Found: C, 73.69; H, 4.14; Br, 4.41.

EXAMPLE 7

Preparation of hydroxy methylene poly(aryl ether ether ketone)

Polymer 2 (0.30 g, 0.81 mmol) was dissolved in 40 mL NMP, and the solution was heated to 90° C. 2.6 mL $H_2O$ was added and the resulting solution was stirred at 120° C. for 6 h. The cooled solution was precipitated into a mixture of isopropanol and hexane (1/1). The polymer was washed twice with boiling methanol and dried in a vacuum oven at 60° C. 0.23 g of polymer 7 was obtained. IR showed a broad band from 3200 to 3600 cm$^{-1}$, maximum at 3450 cm$^{-1}$. Anal. Calcd for C$_{20}$H$_{13.76}$O$_{3.72}$ (60% —CH$_2$OH, 12% —CHO, 28% —CH$_3$): C, 76.60; H, 4.42. Found: C, 73.37; H, 4.37.

EXAMPLE 8

Preparation of cyano methylene poly(aryl ether ether ketone)

Polymer 2 (0.40 g, 1.08 mmol) was dissolved in 30 ml dichloromethane. A solution of tetraethylammonium cyanide (0.17 g, 1.08 mmol) in 10 ml dichloromethane was added dropwise. The mixture was stirred at room temperature for 30 min and precipitated into methanol. The polymer was washed with methanol and dried in vacuum. 0.28 g of polymer 8 was obtained. IR showed a band at 2252 cm$^{-1}$.

EXAMPLE 9

Preparation of acetic acid poly(aryl ether ether ketone)

Polymer 8 (0.20 g) was suspended in 40 ml of 50% aqueous sulfuric acid solution and heated at 140° C. for 2 h. The polymer was washed with plenty of water until neutral, then washed with methanol and dried in vacuum. 0.20 g of polymer 9 was obtained. IR spectroscopy showed a band at 1717 cm$^{-1}$, and a broad band from 2500 to 3300 cm$^{-1}$. Anal. Calcd for C$_{20.72}$H$_{14}$O$_{4.44}$ (72% —CH$_2$COOH, 28% —CH$_3$): C, 74.51; H, 4.22. Found: C, 73.89; H, 4.00; Br, 1.49.

EXAMPLE 10

Preparation of acetoxymethylene poly(aryl ether ether ketone)

Polymer 2 (0.50 g, 1.42 mmol) was dissolved in 40 ml NMP and potassium acetate (0.5 g, 5.08 mmol, ground into fine powder and dried in oven) was added. The mixture was stirred at room temperature for 7 h, then filtered to remove salts. The filtrate was precipitated into methanol. The resulting polymer 10 was washed with methanol and dried in a vacuum oven at 60° C. The yield was 0.45 g. IR showed a band at 1742 cm$^{-1}$. Anal. calcd for C$_{21.24}$H$_{15.24}$O$_{4.24}$ (50% —CH$_2$OCOCH$_3$, 6% —CH(OCOCH$_3$)$_2$, 44% —CH$_3$): C, 75.41; H, 4.54. Found: C, 75.07; H, 4.38.

EXAMPLE 11

Preparation of diethylamine hydrogenbromide methylene poly(aryl ether ether ketone)

Polymer 2 (0.50 g, 1.36 mmol) was dissolved in 30 ml tetrachloroethane and diethylamine (1.41 g, 19.3 mmol) was added. The mixture was heated to 90° C. and stirred for 24 h. The cooled polymer solution was precipitated into methanol, filtered and dried. The polymer was redissolved in 10 ml of chloroform and precipitated into ice-cold THF. Polymer was isolated as a rubbery material. After drying in vacuum, 0.40 g of polymer 11 was obtained as white solid.

EXAMPLE 12

Preparation of diethylamine methylene poly(aryl ether ether ketone)

Polymer 11 (0.30 g) was dissolved in 30 mL chloroform. The polymer solution was washed with 10% NaOH and water and then precipitated into methanol, filtered and dried in a vacuum oven at 50° C. The yield was 0.16 g of polymer 12. Anal. Calcd for C$_{22.88}$H$_{20.36}$Br$_{0.12}$N$_{0.72}$O$_3$ (60% —CH$_2$N(C$_2$H$_5$)$_2$, 12% —CHN(C$_2$H$_5$)$_2$Br, 28% —CH$_3$): C, 75.70; H, 5.65; Br, 2.64; N, 2.78. Found: C, 75.82; H, 5.60; Br, 3.10; N, 2.38.

EXAMPLE 13

Preparation of triethylammonium bromide methylene poly(aryl ether ether ketone)

Polymer 2 (0.50 g, 1.44 mmol) and triethylamine (0.09 g, 0.89 mmol) were dissolved in 30 mL NMP. The reaction solution was heated at 80° C. for 88 h. The cooled solution was precipitated into a mixture of 100 ml hexane and 100 ml isopropanol. The polymer was washed twice with boiling methanol and dried in vacuum at 60° C. There was obtained 0.53 g light yellow solid polymer 13. Anal. Calcd for C$_{22.94}$H$_{20.8}$Br$_{0.55}$N$_{0.49}$O$_3$ (43% —CH$_2$N(C$_2$H$_5$)$_3$Br, 6% —CHBrN(C$_2$H$_5$)$_3$Br, 51% —CH$_3$): C, 69.70; H, 5.30; Br, 11.12; N, 1.74. Found: C, 69.74; H, 4.88; Br, 10.65; N, 1.66.

EXAMPLE 14

Preparation of aldehyde poly(aryl ether ether ketone)

Polymer 3 (1.50 g, 3.15 mmol) was dissolved in 250 mL NMP, and the solution was heated to 90° C. 16 mL H$_2$O was added dropwise and the reaction mixture was stirred at 120° C. for 6 h. The cooled solution was precipitated into a 500 mL mixture of isopropanol and hexane (1/1). The polymer was collected on a filter and air dried. Subsequently, the polymer was redissolved in 50 mL chloroform, filtered and precipitated into 200 mL mixture of isopropanol and hexane. The polymer was washed two times with boiling methanol and dried in vacuum oven at room temperature. 0.92 g (92% yield) of white polymer 14 was obtained. IR spectroscopy showed a band at 1693 cm$^{-1}$. Anal. Calcd for C$_{20}$H$_{12}$O$_4$: C, 75.94; H, 3.82. Found: C, 74.66; H, 3.56.

EXAMPLE 15

Preparation of carboxylic acid poly(aryl ether ether ketone)

Polymer 14 (0.20 g, 0.63 mmol) was dissolved in 30 mL NMP. 10 mL DMSO was added into the solution. Monosodium phosphate (0.10 g, 0.84 mmol) was dissolved in 0.5 mL water and added dropwise to the solution. Sodium chlorite (0.22 g, 2.43 mmol) was dissolved in 1.5 mL water and added dropwise to the solution. The reaction mixture was stirred at room temperature for 20 h. The polymer was precipitated into 150 mL mixture of isopropanol and hexane (1/1). The polymer was then washed one time with methanol and twice with water, and two more times with boiling methanol. The polymer was dried, dissolved in THF acidified with a few drops of HCl, and reprecipitated into methanol. After drying in vacuum, 0.17 g (81%) of polymer 15 was obtained as a white material. IR spectroscopy showed a band at 1730 cm$^{-1}$, and a broad band from 2500 to 3300 cm$^{-1}$. Anal. Calcd for C$_{20}$H$_{12}$O$_5$: C, 72.29; H, 3.64. Found: C, 69.60; H, 3.39.

EXAMPLE 16

Preparation of methyl carboxylated poly(aryl ether ether ketone)

The reaction was carried out under nitrogen. Polymer 15 (0.20 g, 0.60 mmol) was suspended in 20 mL dry dichloromethane. Trimethyloxonium tetrafluoroborate (0.12 g, 0.81 mmol) was added to the reaction mixture. N,N-diisopropylethylamine (0.10 g, 0.78 mmol) was added via syringe. The reaction mixture was stirred at room temperature. After several hours, the polymer and the tetrafluoroborate salt dissolved. The stirring was continued for a total of 20 h. The mixture was precipitated into 100 mL methanol. The polymer was washed one time with methanol, one time with water and two times with boiling methanol, then dried under vacuum at 60° C. The yield of white polymer 16 was 0.18 g (86%). IR showed a band at 1735 cm$^{-1}$. Anal. Calcd for $C_{21}H_{14}O_5$: C, 72.83; H, 4.07. Found: C, 73.34; H, 3.93.

EXAMPLE 17

Preparation of carbonyl fluoride poly(aryl ether ether ketone)

A film was cast from a 5% solution in THF of the polymer 15. The film was dried under vacuum for two days. The film was charged into a PE bottle and the bottle was purged with nitrogen for 30 min, then purged with $SF_4$ for 5 minutes. The bottle was capped and left standing overnight. After the reaction was completed, the bottle was purged with nitrogen for one hour and the film was dried under vacuum for two hours. The polymer film 17 was examined by IR spectroscopy and showed a band at 1821 cm$^{-1}$.

The following example 18 illustrates one of bromination experiments carried out using NBS as the brominating agent.

EXAMPLE 18

Two gram (6.6 mmole) of polymer 1 was dissolved in 90 mL of dichlorobenzene and 20 mL of chlorobenzene. The mixture was then heated to 200° C. to distil off 20 mL solvent. The solution was cooled to 100° C. and 1.2 gram (6.6 mmole) of NBS was added. Next, the solution was heated to 120° C. and stirred for 3 hrs. The product was worked up as usual and 2.12 gram of polymer was obtained. $^1$H NMR showed that the polymer contained 49% monobromomethyl units, 3% dibromomethyl units and 48% methyl units. SEC showed a high molecular (about 20%) fraction in the product, indicating that some crosslinking occurred during the bromination process.

From the example 18 it can be concluded that bromination of bromomethyl derivatives of PAEK using NBS is not as successful as the bromine route in which no crosslinking is observed. Under carefully controlled conditions, bromination with NBS can be carried out but the product will contain some crosslinked fraction.

The above examples, particularly 1–17, confirm that the bromination of methyl derivatives of PAEK polymers leads to intermediates which are useful for the purpose of functionalization of these polymers. Various functional groups can be introduced into the polymers via substitution and oxidation reactions. The bromomethyl groups on PAEK also have the potential to be used in grafting and cross-linking reactions.

We claim:

1. A process for preparing derivatives of a polyaryletherketone containing repeating units (I)

alone or in conjunction with other repeating units selected from the group consisting of subunit II

II and

III where M is selected from the group consisting of

IV

V and

VI

A is —O— or —CO— and n is 1 or 2,
the process comprising
a) providing a methyl derivative of said polyaryletherketone with methyl groups being substituted predominantly on the phenylene rings of the subunits M, and
b) brominating said methyl derivative in conditions effective to obtain a bromomethyl derivative of said polyaryletherketone.

2. The process according to claim 1 wherein the bromination is carried out using bromine.

3. The process according to claim 1 wherein the bromination is carried out using N-bromosuccinimide.

4. The process according to claim 1 wherein the bromination is carried out in conditions effective to obtain predominantly a monobromomethyl derivative of said polyaryletherketone.

5. The process according to claim 4 wherein the percentage of monobromomethyl groups in said monobromomethyl derivative is from about 1% to about 70%.

6. The process according to claim 1 wherein the bromination is carried out in conditions effective to obtain predominantly a dibromomethyl derivative of said polyaryletherketone.

7. The process according to claim 6 wherein the bromination is controlled using ultraviolet radiation.

8. The process according to claim 5 wherein the percentage of dibromomethyl groups is from about 50% to about 100%.

9. The process according to claim 1, further comprising the step of reacting said bromomethyl derivative with a reagent which is reactive with the bromomethyl derivative to convert the bromomethyl group to another functional group selected from methoxy methylene, methyl carboxylate, hydroxy methylene, cyano methylene, acetic acid, acetoxy methylene, diethylamine hydrogenbromide methylene, diethylamine methylene, triethylammonium bromide methylene, aldehyde, carboxylic acid, or carbonyl fluoride.

10. The process according to claim 9 wherein the reagent is selected from the group consisting of methanol, benzyl(triethyl)ammonium permanganate, tetrabutylammonium permanganate, tetrabutylammonium cyanide, potassium acetate, diethylamine, triethylamine, water, sodium chlorite, trimethyloxonium tetrafluoroborate, and sulfur tetrafluoride.

11. The process according to claim 1 wherein the polyaryletherketone is one of the following: poly(aryl ether ether ketone), poly(aryl ether ether ketone ketone), poly(aryl ether ether ketone ether ketone), poly(aryl ether ether ketone ketone ether ketone) or poly(aryl ether ether ketone ether ketone ketone).

12. A bromomethyl derivative of a polyaryletherketone, the derivative containing repeat units (VII)

alone or in conjunction with other repeat units selected from subunit II

II or

III where M is selected from

IV

V and

VI

Me is methyl or substituted methyl group, x is a number from about 0.01 to about 12, y corresponds to the number of methyl groups x multiplied by the degree of bromination, A is —O— or —CO— and n is 1 or 2.

13. The bromomethyl derivative of claim 12 comprising predominantly monobromomethyl derivative of said polyaryletherketone, the degree of bromination corresponding approximately to at least 1% of monobromomethyl groups, the balance being dibromomethyl and non-substituted methyl groups.

14. The bromomethyl derivative of claim 12 comprising predominantly dibromomethyl derivative of said polyaryletherketone, the degree of bromination corresponding approximately to at least 50% of dibromomethyl groups, the balance being monobromomethyl and non-substituted methyl groups.

15. A polyaryletherketone derivative containing repeating units of the formula (VIII)

alone or in conjunction with other repeat units selected from

II or

III where M is selected from

IV

V and

VI x is a number from 0.01 to about 12, A is —O— or —CO—, n is 1 or 2, and Z is a substituent selected from the group consisting of methoxy methylene, methyl carboxylate, hydroxy methylene, cyano methylene, acetic acid, acetoxy methylene, diethylamine hydrogenbromide methylene, diethylamine methylene, triethylammonium bromide methylene, aldehyde, carboxylic acid, and carbonyl fluoride.

* * * * *